United States Patent
Reindel et al.

(10) Patent No.: US 7,684,878 B2
(45) Date of Patent: Mar. 23, 2010

(54) PROGRAMMABLE HARDWARE ELEMENT PRE-REGULATOR

(75) Inventors: Kenneth A. Reindel, Cedar Park, TX (US); George C. Topala, Cedar Park, TX (US); Gustavo Jesus Castro, Austin, TX (US)

(73) Assignee: National Instruments Corporation, Austin, TX (US)

( * ) Notice: Subject to any disclaimer, the term of this patent is extended or adjusted under 35 U.S.C. 154(b) by 547 days.

(21) Appl. No.: 11/620,803

(22) Filed: Jan. 8, 2007

(65) Prior Publication Data

US 2007/0185590 A1 Aug. 9, 2007

Related U.S. Application Data

(60) Provisional application No. 60/771,079, filed on Feb. 7, 2006.

(51) Int. Cl.
  *G50B 11/01* (2006.01)
(52) U.S. Cl. ....................................................... 700/22
(58) Field of Classification Search .................. 700/22, 700/286, 297, 298; 713/300, 320, 310, 321; 323/241, 266, 273, 283, 284, 268, 269, 270, 323/274
See application file for complete search history.

(56) References Cited

U.S. PATENT DOCUMENTS

| | | | | |
|---|---|---|---|---|
| 6,031,362 A | * | 2/2000 | Bradley | 323/269 |
| 6,219,628 B1 | * | 4/2001 | Kodosky et al. | 703/2 |
| 6,262,567 B1 | * | 7/2001 | Bartlett | 323/303 |
| 6,396,169 B1 | | 5/2002 | Voegeli et al. | |
| 6,897,677 B2 | | 5/2005 | Devlin et al. | |
| 7,142,009 B1 | | 11/2006 | Watt et al. | |
| 7,154,253 B1 | * | 12/2006 | Gunther | 323/283 |
| 7,193,864 B2 | | 3/2007 | Hansson et al. | |
| 7,392,405 B2 | * | 6/2008 | Nachamiev et al. | 713/300 |

\* cited by examiner

*Primary Examiner*—Bao Q Vu
*Assistant Examiner*—Nguyen Tran
(74) *Attorney, Agent, or Firm*—Meyertons Hood Kivlin Kowert & Goetzel, P.C.; Jeffrey C. Hood; Joel L. Stevens

(57) ABSTRACT

System and method for providing a programmable power supply. The programmable power supply may include a programmable hardware element (PHE) that couples to a power supply (DC-DC converter) and which in turn couples to a linear regulator. The PHE may implement a PID control algorithm that receives a measurement of the output power and may use PID and/or non-linear control to ensure that the power supply and the linear regulator maintain similar power levels. The PHE may be configured based on a graphical program, thus enabling fast and efficient modifications to the programmable power supply.

16 Claims, 11 Drawing Sheets

PROGRAMMABLE HARDWARE ELEMENT PRE-REGULATOR

PRIORITY DATA

This application claims benefit of priority of U.S. provisional application Ser. No. 60/771,079 titled "Programmable Hardware Element Pre-Regulator" filed Feb. 7, 2006, whose inventors were Kenneth A. Reindel, George C. Topala, and Gustavo Jesus Castro.

FIELD OF THE INVENTION

The present invention relates to the field of precision DC sources/power supplies, and more particularly to a system utilizing a programmable hardware element (PHE) implementing PID control pre-regulator.

DESCRIPTION OF THE RELATED ART

In recent years, there has been a proliferation of electrical devices that require specific voltages, currents, and/or powers.

In general, there are two fundamental ways of providing variable regulated voltage/current: a) classic switch mode converters with an adjustable output and b) linear regulators with adjustable output. Classic switch mode converters can be highly efficient, e.g., greater than 80 percent, and can be made relatively small if a sufficiently high operating frequency is selected. However, in many cases, noise is difficult to eliminate from the output, and there may be severe limitations for output DC levels when using off-the-shelf components, e.g., class D amplifiers. Using linear regulators with adjustable outputs may solve this problem, but efficiency is often reduced significantly, e.g., to efficiencies close to 30-50 percent.

Some prior art methods have been developed to overcome these shortcomings. For example, one prior art method utilizes analog tracking circuits and discrete analog circuitry to create a rail with fixed headroom above the programmed output. More specifically, the prior art uses a linear stage to provide a low-noise output, and a pre-regulation to optimize efficiency. However, in order to provide a complete solution using this technique, the required components and circuits may become overly complex and expensive.

Thus, improved methods for providing variable regulated electricity are desirable.

SUMMARY OF THE INVENTION

Various embodiments are presented of a system and method for providing a programmable power supply. The programmable power supply may comprise a programmable hardware element (PHE) that couples to a power supply (DC-DC converter) and which in turn couples to a linear regulator. The PHE may implement a PID control algorithm that receives a measurement of the output power and uses PID control to ensure that the power supply and the linear regulator maintain similar power levels. The PHE may be configured based on a graphical program, thus enabling fast and efficient modifications to the programmable power supply. The method may operate as follows.

Input specifying a desired output power may be received. In some embodiments, this input may be user input received directly to the programmable hardware element, e.g., acting as a pre-regulator. Alternatively, or additionally, the input may be received from another system, e.g., a controlling computer system, among others. The PHE may be included in a PXI chassis (e.g., as a card coupled to the backplane of the chassis). Additionally, the PHE may be a programmable gate array such as a field-programmable gate array (FPGA).

An output signal may be generated to control a power supply in response to the input and/or a feedback signal. In some embodiments, if the input specifies a new power level (e.g., different than a previous power level) the output of the PHE may be based on only the input. In such cases, in one embodiment, the output of the PHE may be determined by a non-linear controller. More specifically, as indicated above, the non-linear controller may be used (e.g., in the place of a PID controller) when output parameters change (e.g., as specified by the input) or when the output voltage drops significantly.

Alternatively, or additionally, the output signal may be based on a feedback signal which may be based on a measurement of output from the power supply being pre-regulated by the PHE. More specifically, the output, e.g., current and/or voltage output, of the power supply may be measured and provided to the PHE using, for example, one or more ADCs. Correspondingly, the PID controller of the PHE may be used in response to the feedback signal instead of the non-linear controller described above. However, it should be noted that in some embodiments the PHE may use non-linear and PID techniques to conjunctively control the power supply. Note further that while the above embodiments have been described with two controllers (a non-linear and PID controller), in some embodiments, the PHE may use a single controller that implements both PID and non-linear control in response to input and feedback signals. The controller may implement the PID and non-linear control separately or conjunctively as desired.

The output signal may be provided to the power supply, e.g., to be used for modulation/modification of power provided by a power source. For example, the output of the PHE (e.g., the pre-regulator) may be provided to the power supply, and, in response to receiving the output of the PHE, the power supply may modulate power signal(s) received from a power source. The power source may be from, for example, the backplane of the PXI chassis to which the PHE may be coupled or from an external power source such as a wall socket (among others). Note that the power source may be a combination of power sources; for example, the power may be provided primarily from the backplane of the PXI chassis and may be augmented by an external power source (e.g., coupled to the PXI chassis). Thus, the output signal may be used by a power supply to provide and maintain output of a stable power signal. More specifically, the output signal may be usable, e.g., by the power supply and/or the linear regulator, to minimize power dissipated by the power supply and maximize power delivered by the power supply.

Power may be provided to a device coupled to the power supply. In some embodiments, the modulated power may be first provided to a linear regulator and then provided to the device. Thus, the PHE may operate to provide programmable power. The PHE may act as a pre-regulator for a linear-regulator, which may provide power to a device.

The PHE may be operable to generate the output signal and receive the digital signal (and/or the feedback signal) a plurality of times to maintain stability of the power signal over time.

As described above, the PHE may be implemented/configured according to a graphical program (such as those described above, among others). The graphical program may include a plurality of interconnected nodes (e.g., nodes connected by lines) which visually indicate functionality of the graphical program. The graphical program may be used to configure the PHE in order to provide the programmable power supply described herein. Thus, the steps described above (e.g., receiving input, generating an output signal, and providing power to a device) may be performed in accordance with one or more graphical programs implemented on the PHE.

BRIEF DESCRIPTION OF THE DRAWINGS

A better understanding of the present invention can be obtained when the following detailed description of the preferred embodiment is considered in conjunction with the following drawings, in which.

Figure 1:
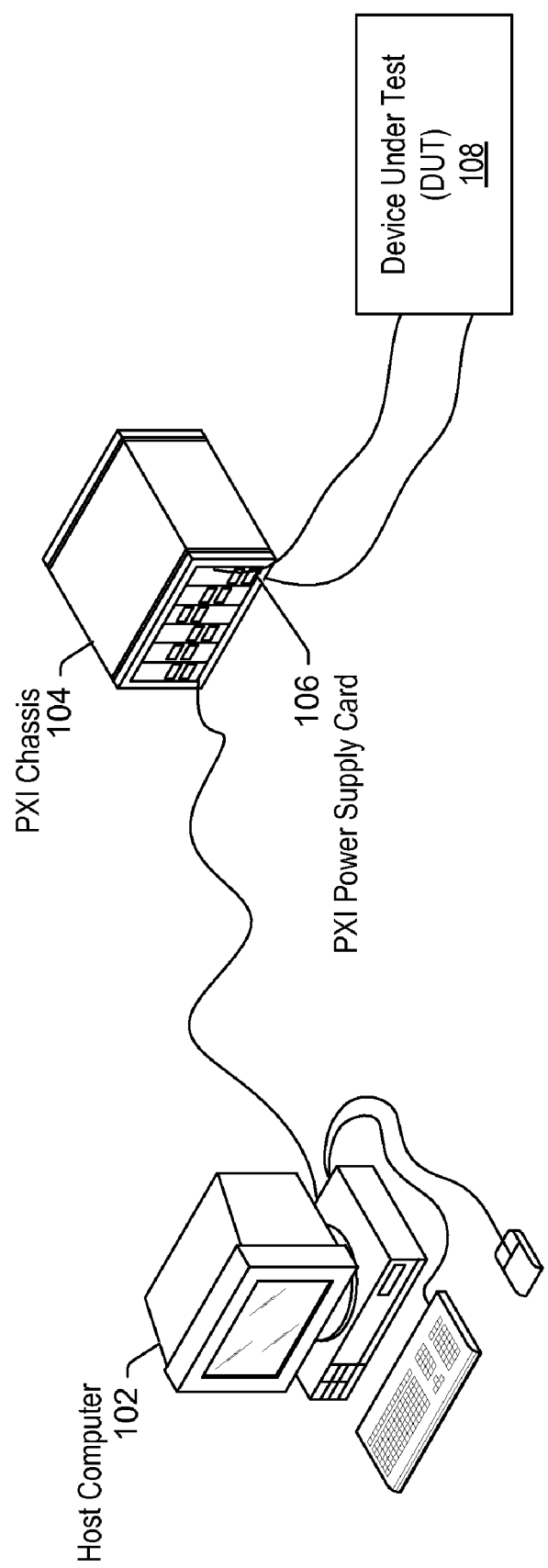
FIG. 1 illustrates an exemplary system having a programmable power supply.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. provisional application Ser. No. 60/771,079 titled "Programmable Hardware Element Pre-Regulator" filed Feb. 7, 2006, whose inventors were Kenneth A. Reindel, George C. Topala, and Gustavo Jesus Castro.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices consisting of multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires. The blocks in a graphical program may also be referred to as graphical program nodes or simply nodes.

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Exemplary System

FIG. 1 illustrates an exemplary system that may include a programmable power supply according to one embodiment of the invention. As shown, the exemplary system may include a computer system 102 coupled to a PXI chassis 104. The PXI chassis may be adapted to receive one or more PXI plug-in cards. At least one of the PXI cards may comprise a card 106 that implements a programmable power supply. The programmable power supply card may operate (e.g., with a power source, such as, for example, the PXI chassis 104 and/or an external power source) to provide power to an external device under test (DUT) 108, such as in an automated test equipment (ATE) application. In some embodiments, the power supply card may include a programmable hardware element (PHE) which may act is a pre-regulator for the power supply. The PHE may be configurable according to a graphical program (described in more detail below). The graphical program may include a plurality of interconnected nodes (e.g., via wires) where the interconnected nodes indicate functionality of the graphical program.

As shown in FIG. 1A, the computer system 102 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 102 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

In some embodiments, the computer system 102 may store a graphical program that may be deployed to various target devices or systems, e.g., such as the PXI chassis 104, the card 106 (e.g., implementing at least a portion of a programmable power supply), the DUT 108, or other systems/devices. Alternatively, or additionally, the computer system 102 may execute a first portion of the graphical program and a second portion may be deployed on one or more targets, such as those listed above, among others. The computer system 102 may be coupled to another computer via a network, such as, for example, an Ethernet network, among others. In some embodiments, the computer system 102 may be coupled to the chassis 104 via a network (e.g., the network from above, or a different network) as well. Note that the computer 102, the other computer, and the chassis 104 may be included or excluded from the system as desired. For example, in one embodiment, the system may only include the computer 102 and the chassis 104, coupled locally, or via a network. Alternatively, the system may include just the computer 102 and the other computer connected via a network (or possibly locally). As indicated above, in one embodiment, the system may include all three devices as well as other systems or target devices.

As indicated above, one or more graphical programs may be executed local to or distributed among any of the devices in the system. For example, a graphical program may be distributed among the chassis 104, the card 106, the DUT 108, the computer system 102, and/or the other computer system coupled to the various devices via a network. Thus, the system may take on a variety of configurations as desired. Note that the above described layouts and configurations are exemplary only and other embodiments are envisioned.

Figure 2:
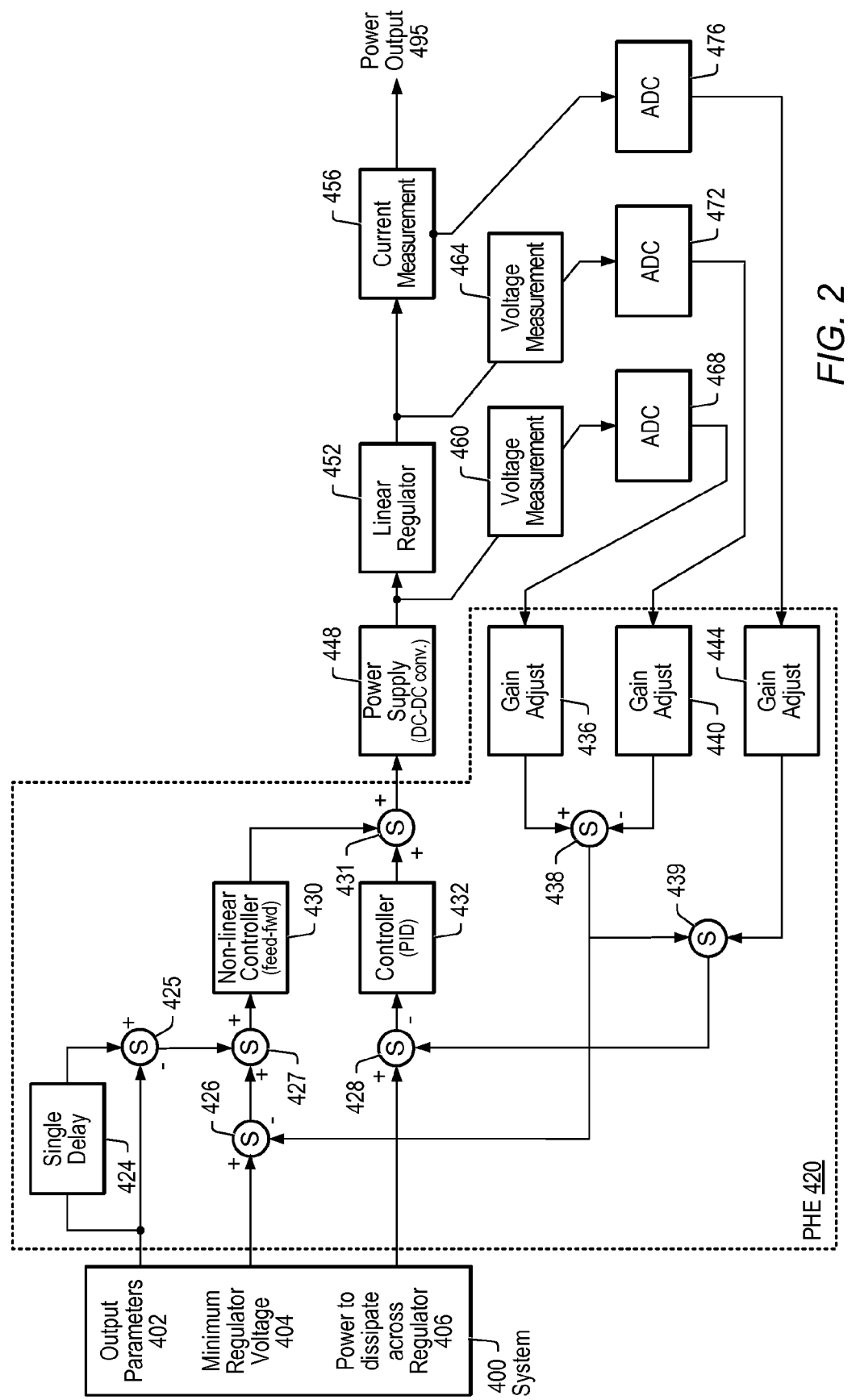
FIG. 2 is a block diagram of an exemplary programmable power supply according to one embodiment of the invention.

FIG. 2—Exemplary Programmable Power Supply

FIG. 2 illustrates an embodiment of a programmable power supply according to one embodiment of the invention. As shown, the programmable power supply may include a programmable hardware element (PHE) 420, e.g., a field-programmable gate array (FPGA). In some embodiments, the PHE 420 may act as a pre-regulator, e.g., for linear regulator 452.

The PHE 420 may be configured to implement functionality which controls voltage and current measurements from the voltage/current source output. A single ADC (analog to digital converter) may be multiplexed between circuitry that senses the output current and voltage, as well as the pre-regulated output voltage. Alternatively, multiple ADCs may be used, as shown in FIG. 2. The ADCs may be used in a feedback path to measure the current power (voltage) output and ensure stable operation of the programmable power supply FIG. 2 is a block diagram of an exemplary system for implementing an embodiment of the current invention. As indicated above, a computer or other device, e.g., system 400, may provide information to the programmable hardware element (PHE) 420, e.g., a field-programmable gate-array (FPGA). As shown in FIG. 2, the information may include output parameters 402 (e.g. desired output voltages and/or current limits), minimum regulator voltage 404, and/or regulator power dissipation 406, among others. Note that these inputs may be provided by one system or multiple systems as desired.

In one embodiment, the output parameters may be compared to the previous output parameters at node 425. In some embodiments, the previous output parameters may be stored in single delay 424, which may be any of a variety of memory devices, as desired. At node 425, the current output parameters 402 and the previous output parameters stored in the single delay 424 may be compared. If the parameters are different, the output of node 425 may include a Boolean value, e.g., true, indicating that feed-forward process(es) may need to be performed.

In some embodiments, information from node 425, e.g., the Boolean value, as well as the comparison between the minimum regulator voltage 404 and the voltage across the control element 452 may be transmitted to node 427 (e.g., via node 426). Node 427 may perform a Boolean addition (OR) based on the input from node 425 or 426. In other words, node 427 triggers non-linear controller 430 in response to either a change to the requested output parameters (indicated by node 425) or a drop in voltage across control element 452. Correspondingly, the resultant signal (e.g., true or false) from node 427 may be transmitted to non-linear controller 430.

Additionally, regulator power dissipation 406 may be transmitted to controller 432 via node 428. The non-linear controller 430 and the PID controller 432 may collectively implement a first regulator, e.g., a pre-regulator. Note that the non-linear controller 430 may be any of numerous controllers which may implement one or more of a variety of appropriate functions. For example, the non-linear controller 430 may implement a ramping function, among other types of functions.

The signal output from the PID controller 432 may be combined with the signal from the non-linear controller 430 (e.g., via node 431) and may be provided as an output of the PHE 420. In some embodiments, node 431 may act as a switch between the non-linear controller 430 and the controller 432. For example, the non-linear controller 430 may be used, for example, when manual control is desired or an arbitrary function is implemented as the control law. Alternatively, the controller 432 may be used, for example, when automatic, closed-loop control is desired. Thus, node 431 may switch between the two controllers according to various conditions as desired.

More specifically, in some embodiments, the non-linear controller may provide a momentary open-loop (e.g., forced, coerced by a function) action that translates into a faster response than the PID could achieve. This may be particularly advantageous in a system with disturbances that occur faster than the PID can compensate. As a result, in certain cases, the non-linear controller may provide faster response (in the time domain) and a tighter control (e.g., minimizing unwanted errors during these disturbances). One example of such disturbance can be a load change which may not be preventable and may occur at any time during the power supply operation. Due to the PID speed and the pre-regulator (448) response speed, it may be necessary to aid the controller 432. More specifically, the non-linear controller 430 may be selected by 431 to achieve optimum results.

As another example, an arbitrary function (e.g. manual control possibly coupled to 430 as an input) may be required to control the power supply in an open-loop mode and override the PID action. As described herein, 431 may not act as a single switch but may insure that the transition between the two controllers is smooth and seamless. Note that in some embodiments, the non-linear controller may use the same feedback loop as the PID controller. Alternatively, or additionally, where faster actions may be required, the non-linear controller may use a separate feedback loop.

As shown, output from the PHE 420 may be provided to power supply 448 (DC-DC converter), e.g., outside of the PHE 420. Power supply 448 may receive power from a power source (not shown) coupled to the power supply 448. In some embodiments, the power supply 448 may perform one or more operations, e.g., DC-DC conversions, on the power received from the power source based on signals received from node 431. Thus, the signal coming from 431 may be used by the power supply 448 for modulating the power received from the power source (e.g., in accordance with the information sent via node 431). The resultant signal may have a voltage level and may be transmitted to voltage measurement device 460 as well as linear regulator 452. Ultimately, the modulated power from power supply 448 may be provided via power output line 495, described in more detail below. Thus, as indicated above, the PHE 420 may act as a pre-regulator for the power supply 448 and/or the linear regulator 452.

The signal from the linear regulator 452 may be transmitted to current measurement device 456 as well as voltage measurement device 464. The current measurement device 456, the voltage measurement device 464, and the voltage measurement device 460 may each transmit their signals to respective analog to digital converters (ADCs), 476, 472, and 468. Each of these in turn may transmit their signals to respective gain adjustment devices 444, 440, and 436. Gain adjustment device 436 and 440 may transmit their signals to node 438, which may in turn send its signal to summation node 426 to be combined with minimum regulator voltage 404 from the system 400. Gain adjustment device 444 may send its signal to node 439 which may use gain adjustment device's signal as well as the signal from 438 to generate a new signal to be sent to the node 428. In some embodiments node 439 may be a multiplication node that performs the operation P=I*V using signals received from gain adjustment device 444 (corresponding to I) and node 438 (e.g., corresponding to V). Subsequently, node 428 may combine this resultant signal with the regulator power dissipation 406 and sent correspondingly to the controller 432. Additionally, in one embodiment, a single delay line similar to 424 may be included for the node 439. This single delay line may store previous power values for later use by node 428, node 426, node, 427, non-linear controller 430, and/or controller 432. As indicated above, the output of the current measurement block 456 may be transmitted via power output 495 from the current measurement device 456.

Thus, the PHE 420 may accept input regarding the required programmed output voltage and current, and may calculate the output power from the measured output voltage and current. The PHE 420 may then appropriately compare the output parameters to the previously set parameters governing the PID (proportional integral derivative) control being performed.

For example, in one embodiment, for optimum step response, the PID may be "reset" to full output for a predetermined number of clock cycles if the voltage between the programmed output and the pre-regulated output drops below a minimum value; for example, 1 V. In some embodiments this reset or override may be performed by the non-linear controller 430, e.g., to provide optimum step response when needed. This reset may enhance step response and efficiency without the use of any additional analog components beyond those needed to provide raw power to the linear output stage. Once the output settles, the PID may then regulate the power dissipated in the output control element to a maximum value-while intelligently maintaining the headroom voltage above a minimum preset value.

Note that in embodiments where the non-linear controller 430 is used instead of the controller 432 (e.g., when node 431 acts as a switch between the two controllers and switches to the non-linear controller 430), error may quickly accumulate for the controller 432 (e.g., according to PID operations). More specifically, this error accumulation may occur because the controller 432 expects an output that does not occur due to the fact that the controller 432 is not being used. This saturation of error may cause problems when node 431 switches back to the output from controller 432 (which may now be generating large change signals). Correspondingly, in one embodiment, the controller 432 may be bypassed, e.g., using a switch, when the non-linear controller 430 is activated. Thus, in some embodiments, saturation of error for the controller 432 as well input overreaction by the controller 432 may be avoided.

Therefore, one embodiment of the invention utilizes a PHE which measures the voltage, current, and power being demanded from an output, and intelligently tailors the pre-regulation to deliver optimized efficiency, step response, and noise. This new approach minimizes cost and component count. All of these are critical success factors to implementing a high-performance voltage/current source, e.g., within the confined volume of a 3U single-slot PXI modular instrument.

An example of this flexibility is in trading off operating point to improve noise performance. It is known that at lower collector-emitter or drain-source voltages (required for high efficiency), discrete power devices (used as output pass elements in power stages) exhibit less ability to isolate noise appearing between these terminals. At lighter loads, this issue potentially results in more noise passing from the switch mode pre-regulator to the output. With the advantages of the embodiments described herein, the operating point can be programmed to automatically increase the collector-emitter or drain-source voltage when operating at light loads, simply by setting the appropriate operating parameters of the FPGA-driven PID. This equivalent function, if implemented in analog circuitry, could be quite complex and expensive.

Another example of this flexibility is optimizing power drawn from the input power supply; in this case, the PXI backplane. Power available from PXI is very limited, so it is necessary to provide an external power source for applications above 5 W. However, many applications exist for 5 W and lower power levels such that the customer should not be required to supplement the PXI backplane. Using this approach, different PID set points (resident on the FPGA) are used for powering from internal PXI power vs. external power. If more power is needed beyond what is available from the PXI backplane, the PID set points are changed to provide more optimum tradeoff between efficiency and step response.

The system described herein may leverage the ADCs, signal conditioning, and FPGA technologies present on the power supply board for measurement read back.

Figure 3:
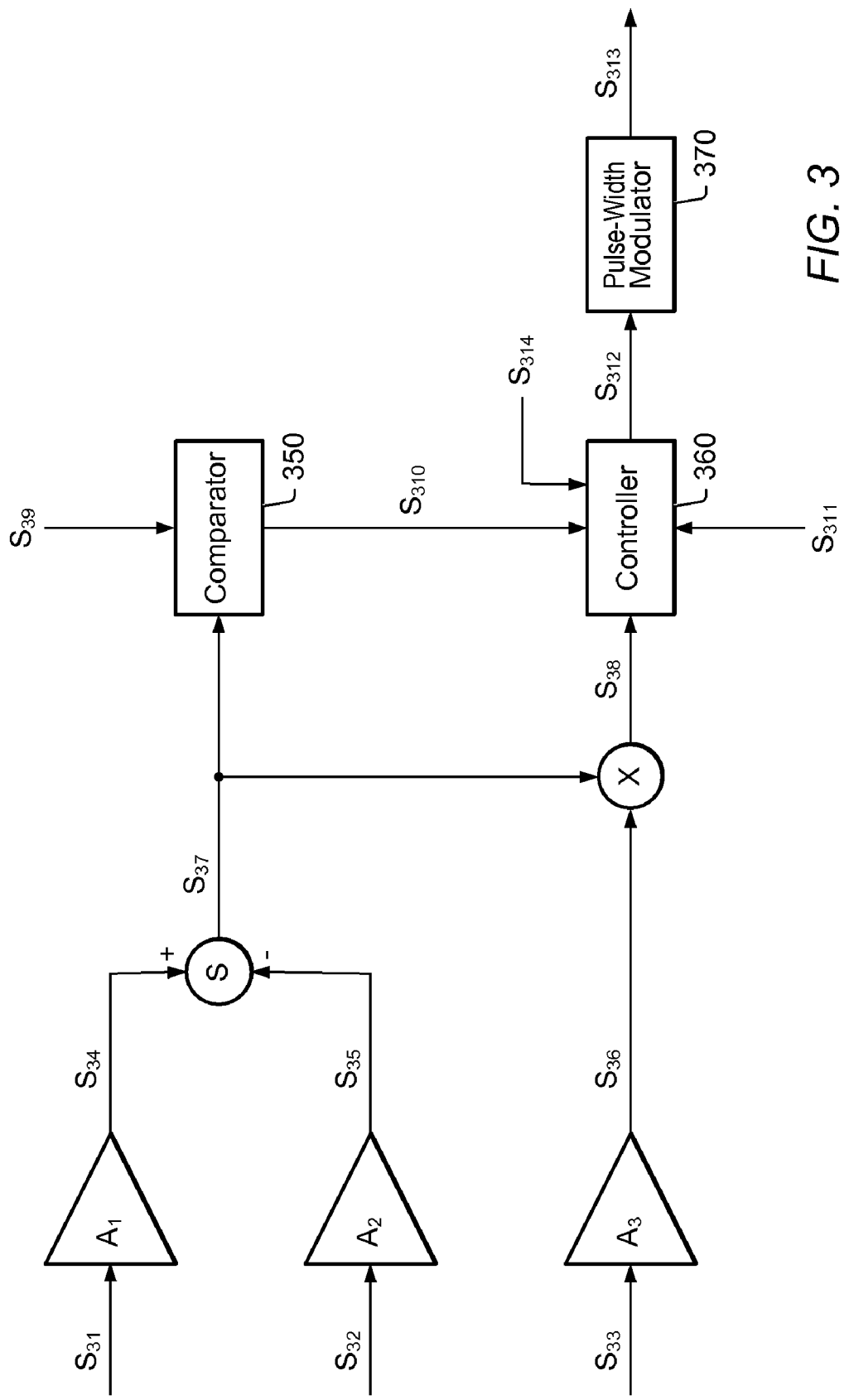
FIG. 3 is a block diagram of a portion of an exemplary programmable power supply according to one embodiment of the invention.

FIG. 3—Exemplary Portion of a Programmable Power Supply

FIG. 3 is an exemplary block diagram illustrating aspects of the programmable power supply described above. More specifically, the Figure and descriptions below provide one embodiment of a portion of the PHE described above with respect to FIG. 2. The following details describe one specific embodiment of the PHE according the block diagram of FIG. 3. Note that the descriptions below are exemplary only and other configurations and implementation details are envisioned. Additionally, descriptions regarding the blocks, nodes, and operation of the programmable power supply of FIG. 2 may apply to this Figure.

Signals (In one embodiment, all signals are digital except S313)
S31 Pre-regulator voltage (before control element)
S32 Output voltage (after control element)
S33 Output current (flowing through control element)
S34 Pre-regulator voltage after gain correction by factor of A1
S35 Output voltage after gain correction by factor of A2
S36 Output current after gain correction by factor of A3
S37 Voltage across control element
S38 Power across control element (process variable)
S39 Low voltage limit across control element (constraint)
S310 Voltage across control element is low (Boolean indicator)
S311 Desired power across control element (constant setpoint)
S312 Coded controller output
S313 Pulse-width modulated (PWM) signal (constant-frequency, variable duty-cycle)
S314 Output change requested (Boolean indicator)
Blocks:
Σ Summation Node
x Multiplication node
A1 Gain correction factor pre-regulator voltage
A2 Gain correction factor for output voltage
A3 Gain correction factor for output current
Comparator—Takes the difference between the pre-regulator voltage and the output voltage and compares to the equivalent of a constant voltage to determine if it is lower than it should be.
Controller—Digital PID algorithm with a non-linear feedforward that is engaged when S9 indicates the voltage is lower than expected or when S14 indicates that a change at the output has been requested by the user.
Pulse Width Modulator—Translates the digital world output from the controller into a constant-frequency, duty-cycle modulated signal which drives the pre-regulator.

Various ones of the blocks and signals in FIG. 3 may, in some embodiments, correspond to blocks and nodes in FIG. 2. For example, comparator 350 may correspond to nodes 425 and/or 426; controller 360 to various possible subsets of the non-linear controller 430, PID controller 432, and/or node 427; S311 to variables 406; and pulse-width modulator 370 may be comprised in controller 432. Note that these correlations are exemplary only, and, in some embodiments, the various blocks and signals of FIG. 3 may operate differently than similar objects depicted in FIG. 2. Additionally, further correlations (e.g., not described above) may be made between various ones of the signals and blocks of FIGS. 2-6.

The block diagram illustrated in FIG. 3 illustrates one embodiment that may be analogous to a signal conditioning stage in a data-acquisition front-end. The inputs (in this case, the voltages before and after the control element and the output current) may need to be combined to calculate the parameter that is being controlled, e.g., the power across the control element. The performed operation may be described with the following formula:

$PV[n]=(Vsw[n]-Vout[n])*Iout[n]$, where $PV[n]$=process variable (power across the control element), $Vsw[n]$=pre-regulator's output voltage (voltage before the control element), $Vout[n]$=power supply's output voltage (voltage after control element), and $Tout[n]$=power supply's output current (current flowing across control element).

It should be noted that these signals may all be in the digital domain (with a possible exception of S313); correspondingly, in one embodiment, all of the parameters may be previously digitized, e.g., before being provided to the PHE.

Additionally, in one embodiment, the comparator 350 may take the voltage across the control element and compare that voltage to a minimum allowed voltage (e.g., a constant). When the voltage across the control element drops below this reference, the comparator may send a signal to the controller which may engage the feed-forward operation. The feed-forward operation (e.g., the non-linear controller) may be triggered by other conditions as well, such as, for example, an output change request. Note that these conditions are exemplary only and other conditions are envisioned.

Figure 4:
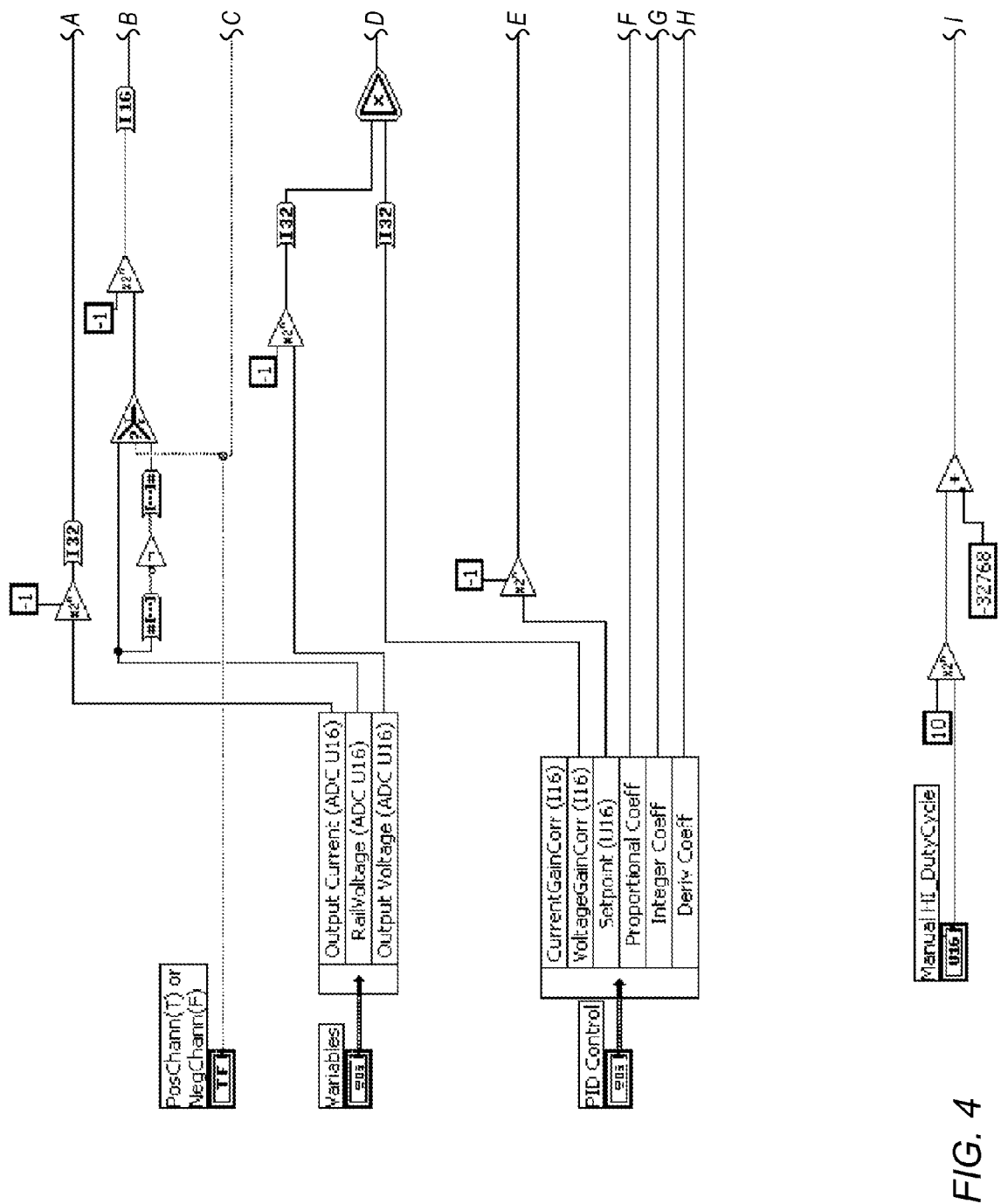
FIG. 4 is an exemplary graphical program corresponding to the block diagram illustrated in FIG. 3 according to one embodiment of the invention.
Figure 4:
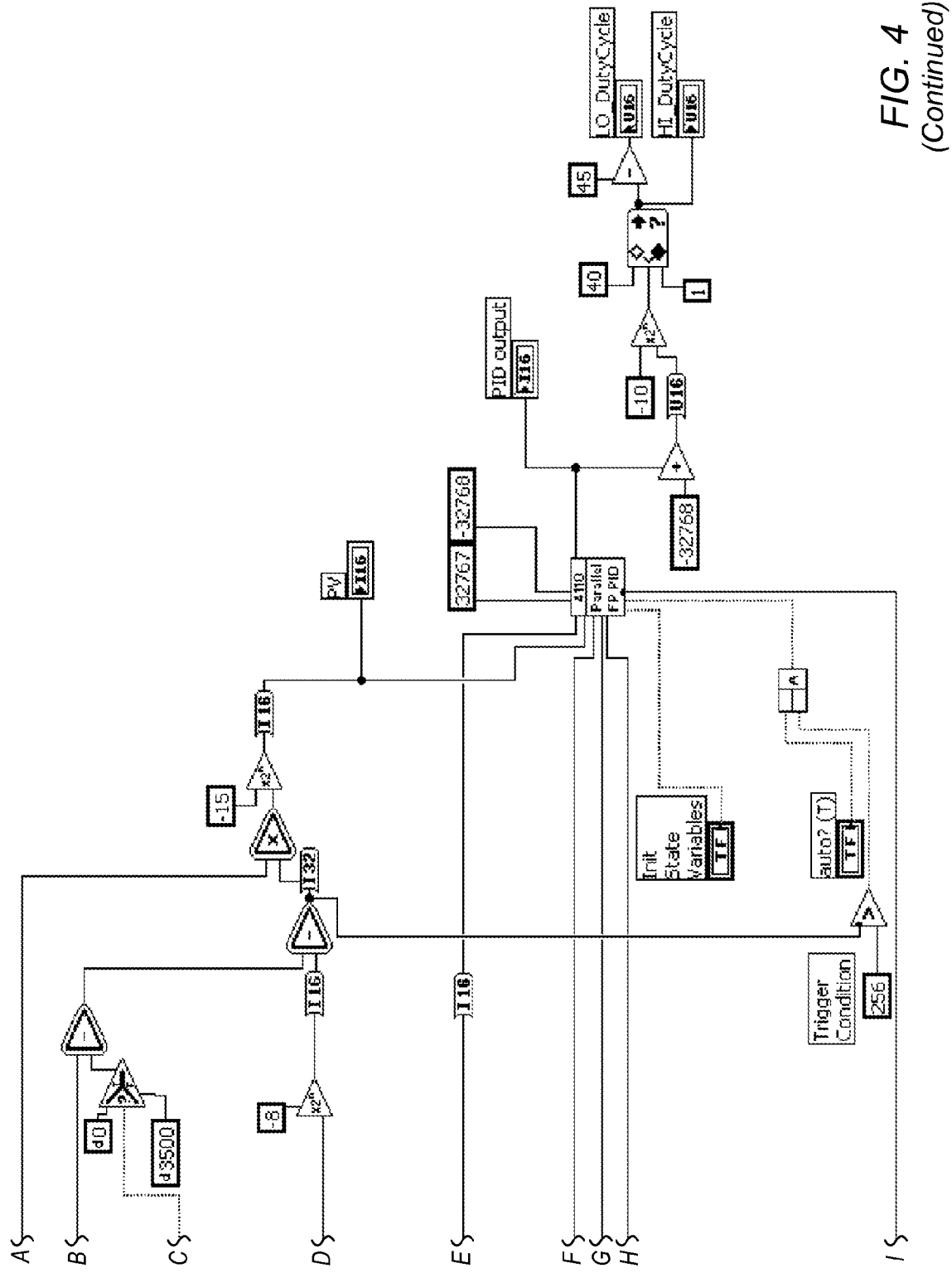

FIG. 4—Graphical Program used to Configure the FPGA

FIG. 4 illustrates a graphical program (e.g., created in LabVIEW® provided by National Instruments Corporation) which is implemented on the PHE 420 according to one embodiment. As indicated above, in some embodiments, the PHE may be configured according to a graphical program (or graphical program portion). In other words, the PHE 420 may be configured according to a netlist, wherein the netlist may be generated based on a graphical program. As shown, the graphical program comprises a plurality of interconnected nodes, which visually indicate the functionality of the program. The graphical program is preferably a data flow diagram implemented in LabVIEW®. For more details regarding configuration of programmable hardware elements according to graphical programs, refer to U.S. Pat. No. 6,219,628 which was incorporated by reference in its entirety above.

The exemplary graphical program of FIG. 4 may represent a specific embodiment of the functionality described above, e.g., with respect to the block diagram of FIG. 3. More specifically, in the diagram of FIG. 4, the process flows from left to right. In one embodiment, the inputs may be digitally stored in memory devices (e.g. registers) inside the PHE 420. These may be represented by the variables, PID control and Manual HI_DutyCycle inputs. The values stored in variables may contain the signals S31, S32 and S33, e.g., obtained from 468, 472 and 476 of FIG. 2. The values stored in PID Control may contain the gain adjustments A1, A2 and A3 (e.g., 436, 440 and 444 in FIG. 2) as well as controller parameters (such as proportional, integral and differential coefficients) and the desired set point S311 (e.g., 406 in FIG. 2). The value stored in Manual HI_DutyCycle may correspond to the signal S310 in Figure. The Trigger Condition value may be constant in this particular embodiment and equivalent to the signal S39 (e.g., 404 in FIG. 2). The Boolean control auto?(T) may be equivalent to the signal S314 (e.g., originated from 425 in FIG. 2 or other sources).

In the process shown by the diagram in FIG. 4, the values stored in Variables may be adjusted by the gain correction values from PID Control. These may then be transferred to the subsequent subtraction and multiplication nodes (e.g., 438 and 439 in FIG. 2) to calculate the power across the control element S38 (PV, as shown in FIG. 4). In this particular embodiment, additional bit manipulation may be required (e.g. bit shifting) to ensure the correctness of the mathematical operation. The difference S37 (e.g., originated at 438 in FIG. 2) from the pre-regulator voltage and the output voltage may be transmitted to the comparator node identified by the symbol ">" to determine if the voltage across the control element is below the desired limit. This may then be transmitted to an OR operation (e.g., 427 in FIG. 2) with the auto?(T) which may be used to decide which controller takes action: the non-linear controller (e.g., if the result is FALSE) or the PID controller (e.g., if the result is TRUE). The rest of the values in PID Control may be necessary for the PID controller operation and they may or may not be transmitted directly (or unmodified) to the PID controller in various embodiments (particular reasons may include, but are not limited to, adjusting word length or scaling). The value from Manual HI_DutyCycle may or may not be transmitted directly (or unmodified) to the non-linear controller in various embodiments (particular reasons may include, but not limited to, adjusting word length or code translation). Thus, the output from the controller "PID output" may be manipulated to generate the necessary codes (or indexes) in signal S312 to drive the Pulse-Width Modulator.

Thus, a user may change the operation of the programmable power supply by modifying the graphical program (e.g., modifying one or more parameters) and then implementing the modified graphical program on the PHE 420. This provides a much more efficient mechanism to design and modify the operation of the programmable power supply. Note that the graphical program of FIG. 4 may represent only a portion of the graphical program that is implemented on the PHE 420. In other words, the graphical program of FIG. 4 is exemplary only and may not represent the entirety of the graphical program which may be implemented on the PHE 420 to provide the full functionality of the systems described herein. Another portion of an exemplary graphical program (or graphical program portion) is described below with regard to FIG. 6.

Figure 5:
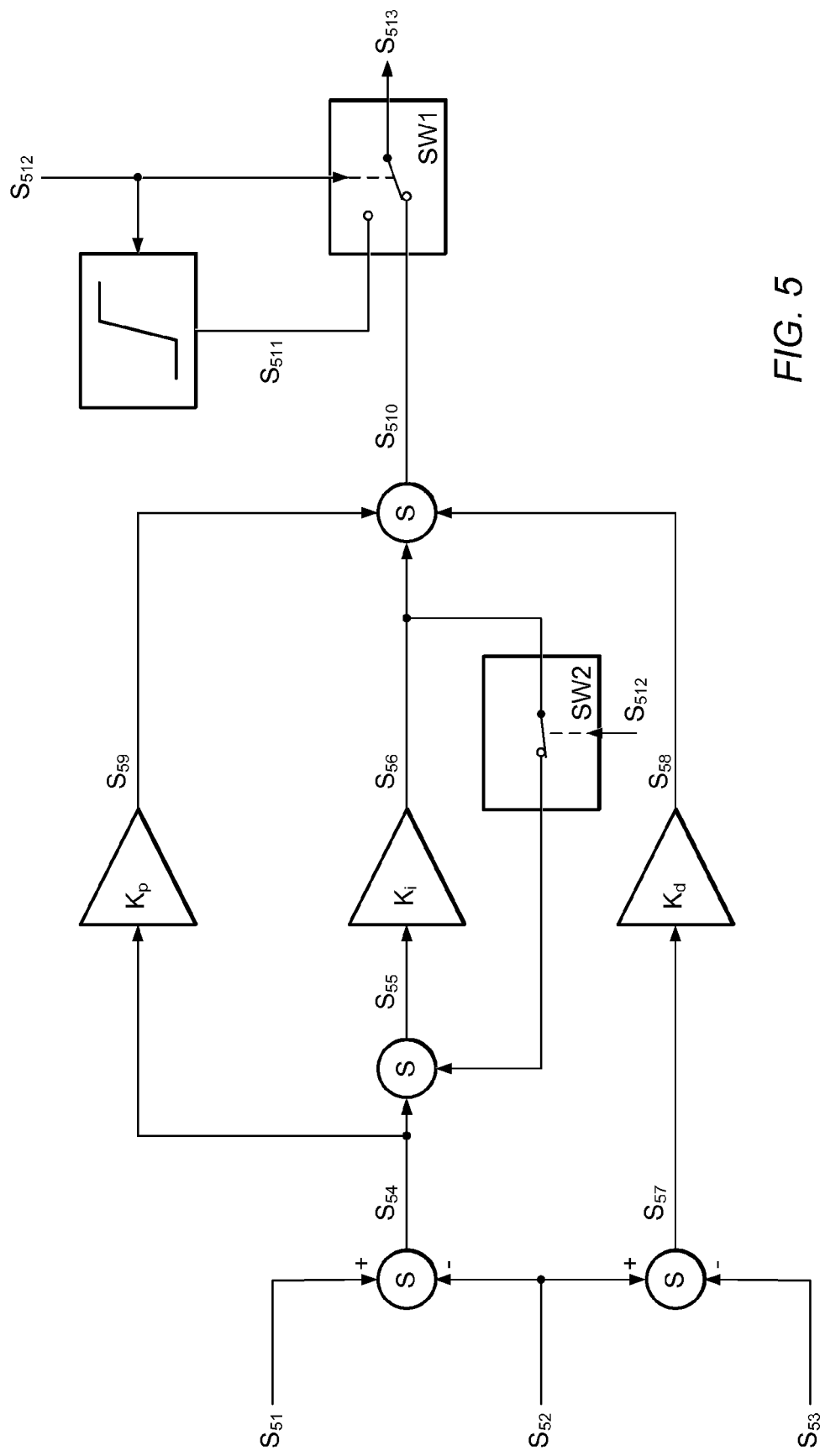
FIG. 5 is a block diagram of a portion of an exemplary controller in a programmable power supply according to one embodiment of the invention.

FIG. 5—Controller Diagram

FIG. 5 is an exemplary block diagram illustrating one embodiment of the controller 432 (and possibly various other components of FIG. 2, e.g., non-linear controller 430, nodes 426, 427, 431, and/or 428). The following details describe one specific embodiment of a controller of the PHE using the block diagram of FIG. 3. Note that the descriptions below are exemplary only and other configurations and implementations are envisioned.

Signals: (In one embodiment, all signals are digital.)

S51 Desired power across control element (set-point)

S52 Present power across control element (process variable)

S53 Previous power across control element

S54 Difference between desired power and present power (error signal)

S55 Accumulated error signal

S56 Integral component

S57 Difference between present and previous power across control element

S58 Differential component

S59 Proportional component

S510 PID output

S511 Non-linear response signal (feed-forward)

S512 Trigger for feed-forward

S513 Controller Output

Blocks:

Σ Summation Node x Multiplication node

Kp Proportional Gain

Ki Integral Gain

Kd Differential Gain

SW51 Selects the desired controller output between S8 and S11

SW52 Avoids saturation in the integrator's feedback when feed-forward is used Ramp Generator—Generates a ramp that is triggered by trigger S12

Similar to above, various ones of the blocks and signals in FIG. 5 may, in some embodiments, correspond to blocks and nodes in FIG. 2. For example, S51 may correspond to the power to dissipate 406; S51 may correspond to output from the non-linear controller 430; S52 may correspond to output from node 439; and switch 1 may correspond to node 431. Note that these correlations are exemplary only, and, in some embodiments, the various blocks and signals of FIG. 5 may operate differently than similar objects depicted in FIG. 2. Additionally, further correlations (e.g., not described above) may be made between various ones of the signals and blocks of FIGS. 2-6.

In one embodiment, the exemplary diagram above describes a digital controller which may implement the following equation:

Output=Kp*(SP[n]−PV[n])+Ki*(SP[n]−PV[n]+SP[n−1]−PV[n−1])+Kd*(PV[n]−PV[n−1]), where Kp= proportional gain, Ki=integral gain, Kd=differential gain, SP[n]=set-point, present value, SP[n−1]=set-point, previous value, PV[n]=process variable, present value, PV[n−1]=process variable, previous value.

In one embodiment, there may be a feed-forward, e.g., non-linear controller 430, which operates in parallel with the controller. The feed-forward may be a non-linear ramp that is triggered whenever there is not enough voltage across the control element (e.g., when the voltage is lower than 1 V). The ramp may allow the PHE to control power in such a way such that the PXI limitations in current and power dissipation are not exceeded. However, this is particular to this implementation and other embodiments are envisioned; for example, the feed-forward may be a DC-signal or any other type of appropriate function, as desired.

The controller described above may be operable to avoid the saturation of the integrator during the feed-forward operation. Since the integrator (Ki) adds the current error (difference between the set-point and the process variable) with the previous error, at the time of applying the feed-forward, the error may become large. Successive addition of this error can result in saturation of the circuit or just a very large error. To avoid this, the feedback may need to be eliminated, e.g., by not adding the previous error into the PID equation while the feed-forward is engaged. This elimination may (or may not) be performed periodically, when certain thresholds are met, or constantly, among other conditions, as desired. Thus, FIG. 5 illustrates an exemplary embodiment of a controller implemented in a programmable power supply.

FIG. 6—Graphical Program used to Configure the FPGA

Figure 6A:
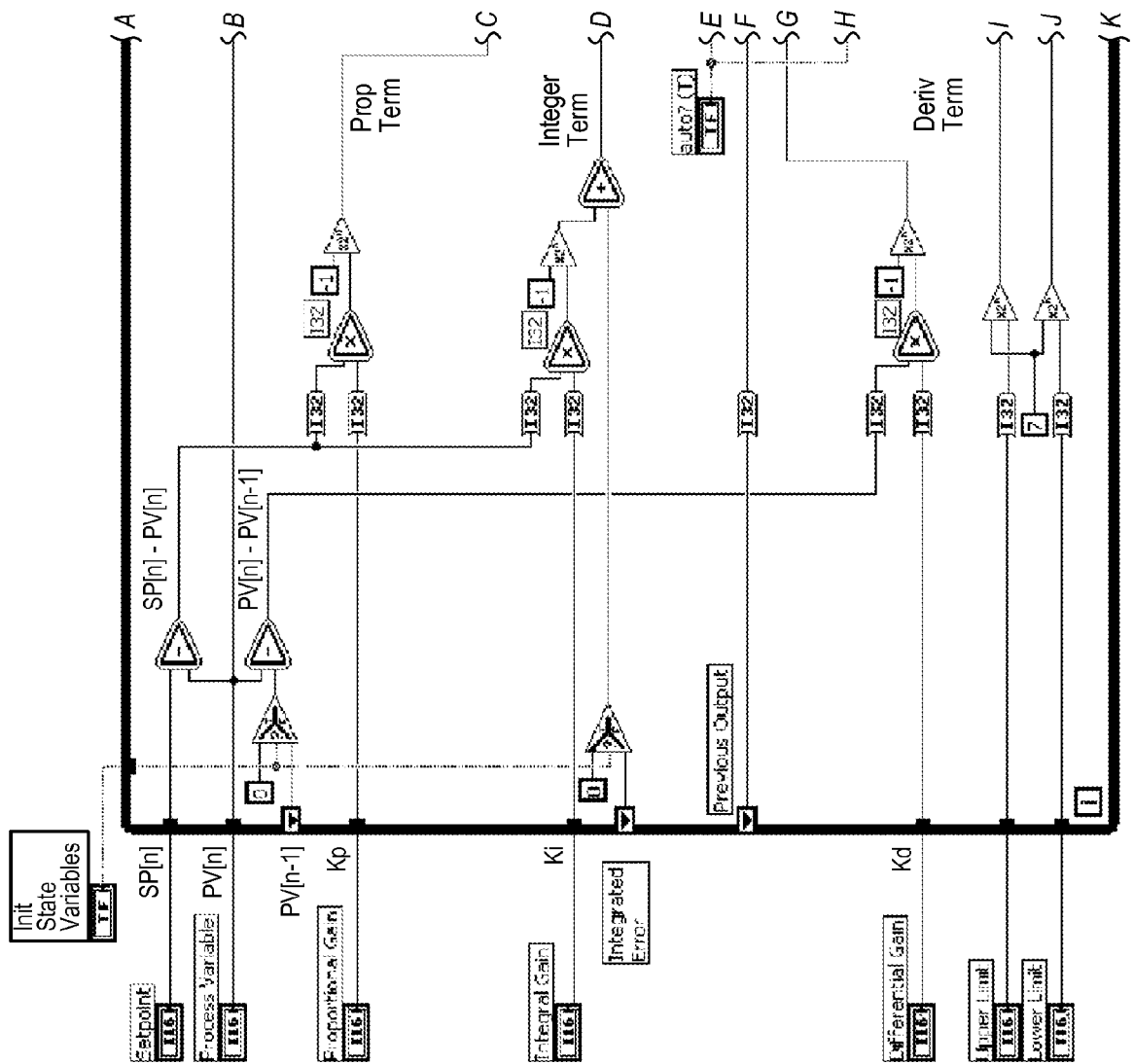
FIG. 6 is an exemplary graphical program corresponding to the block diagram of FIG. 5 according to one embodiment of the invention.
Figure 6A:
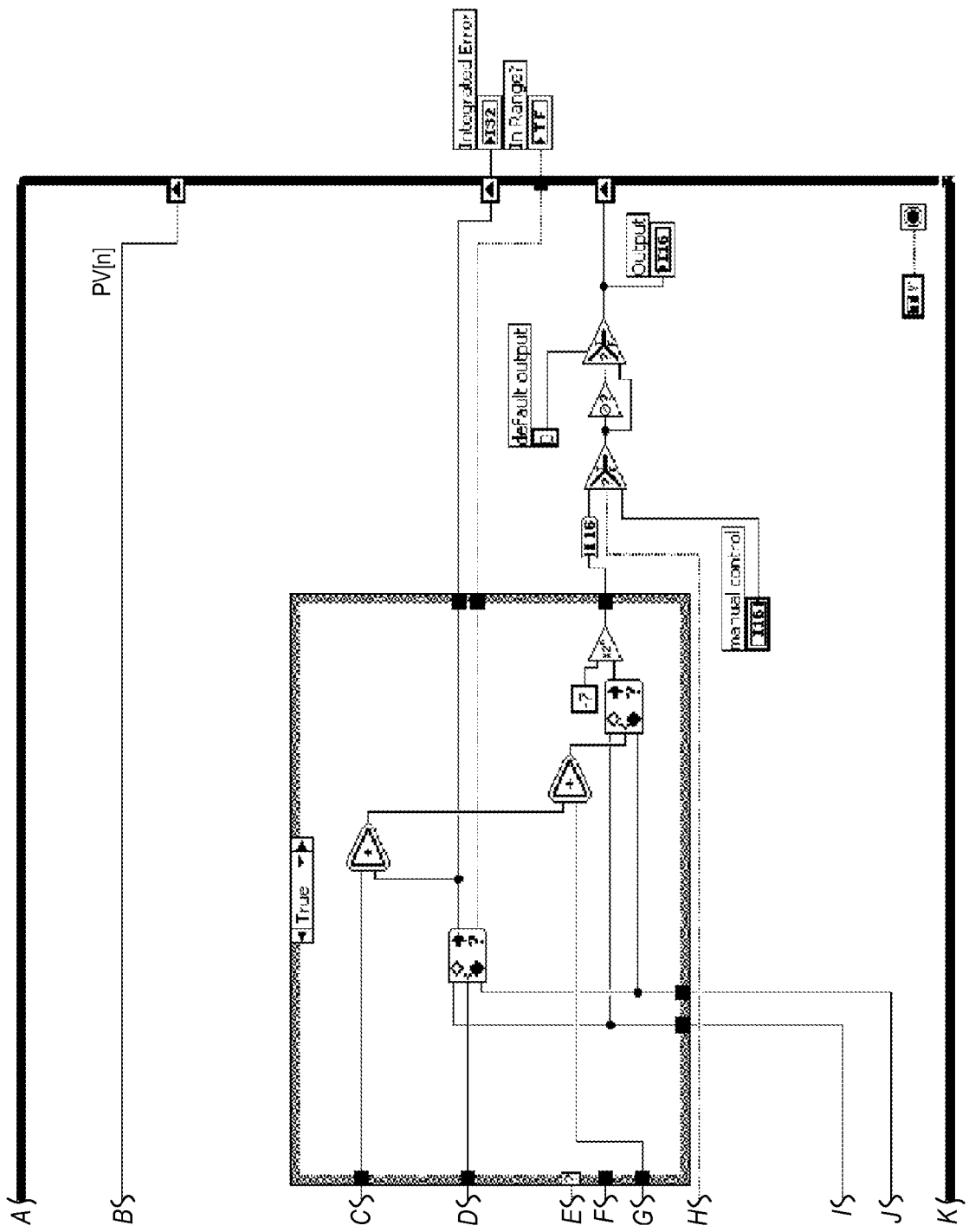
Figure 6B:
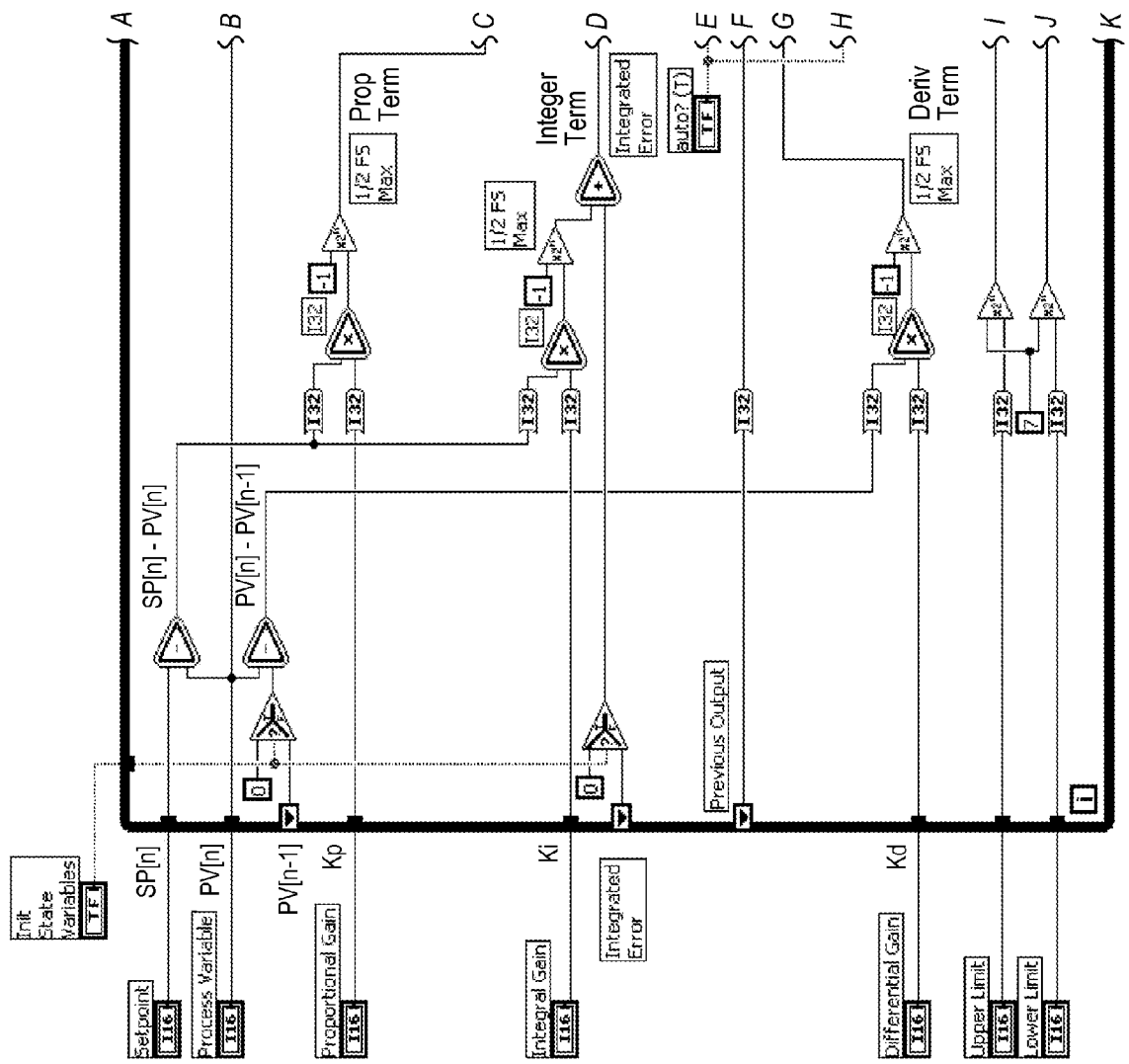
Figure 6B:
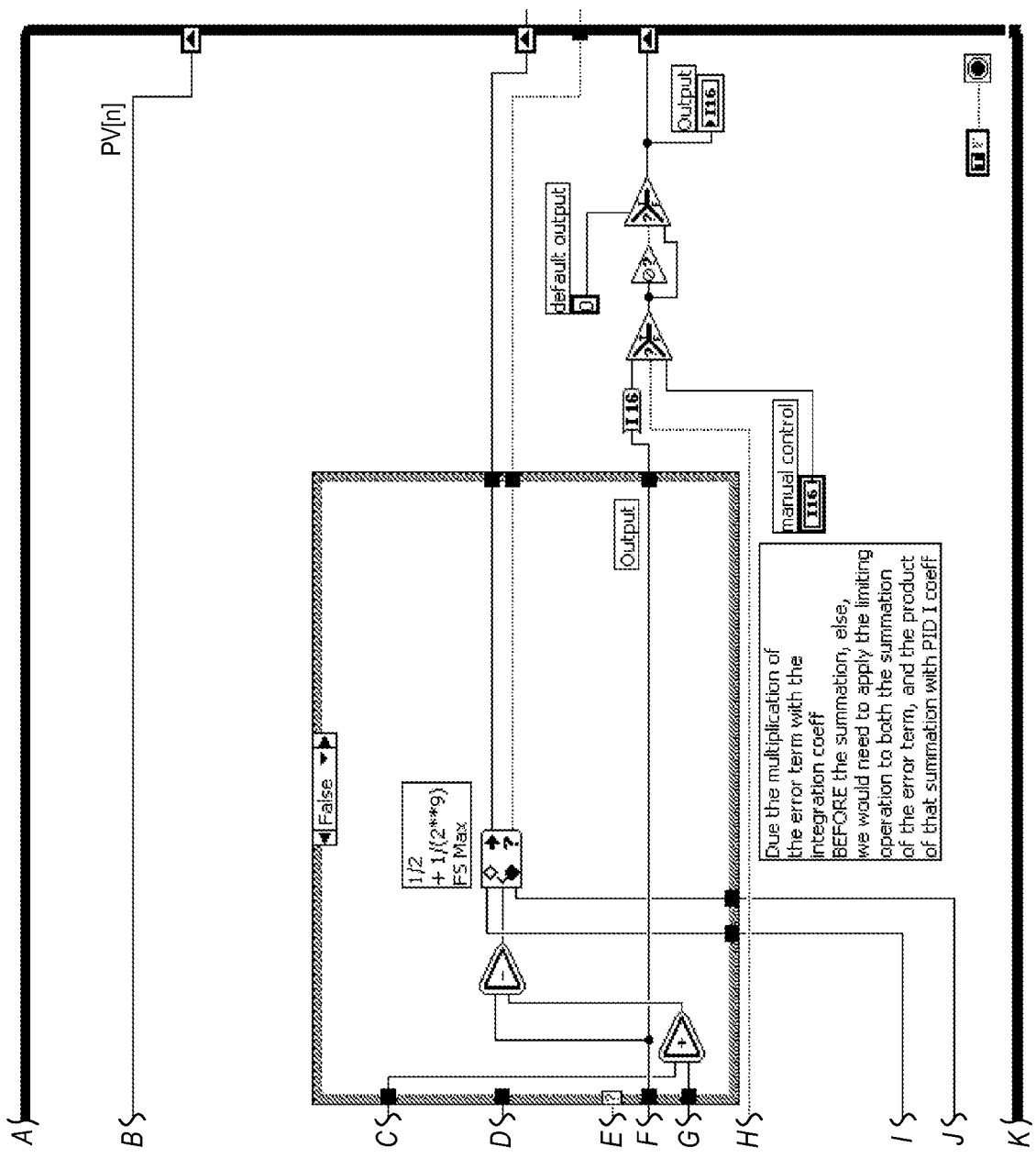

FIGS. 6A and 6B illustrate a graphical program (e.g., created in LabVIEW® provided by National Instruments Corporation) which is implemented on the PHE 420 according to one embodiment. As shown, the graphical program comprises a plurality of interconnected nodes, which visually indicate the functionality of the program. The graphical program is preferably a data flow diagram implemented in LabVIEW®.

The exemplary graphical program of FIGS. 6A and 6B may represent a specific embodiment of the functionality described above, e.g., with respect to the block diagram of FIG. 5. More specifically, the graphical program of FIG. 6A and 6B may implement the functionality (or a portion) of the controller 432, the non-linear controller 430, and/or the switch 431 described above with respect to FIG. 2. FIG. 6A illustrates the graphical program with nodes corresponding to the "True" case of the case structure in the center of the diagram while FIG. 6B illustrates the graphical program with nodes corresponding to the "False" case of the case structure.

As in the previous LabVIEW diagram, the flow may be from left to right. The blocks from FIG. 2 included in FIG. 6 may include node 428, non-linear controller 430, node 431, and/or controller 432. The case structure shown at the center of the figure, i.e. the square labeled "True", contains the portions of the algorithm that are not shared by the PID controller and the non-linear controller. Other portions of the graphical program may be shared by the two controllers. The decision process of the case structure and some of the contents of the case structure may be considered to conceptually combine into 431 from FIG. 2. The case shown in FIG. 6A in this structure may correspond to the PID controller. The non-linear controller is shown in FIG. 6B (labeled "False"). The Setpoint SP[n], Process Variable PV[n], Proportional Gain, Integral Gain and Differential Gain may be the inputs provided to determine the response of the controller. The gains may not change in this particular embodiment, but they could by means of adaptive algorithms. The setpoint may change, e.g., as required by the different operation modes available. The Process Variable may be a dynamic input which brings information from the output, e.g., power dissipated across the control element. As shown, there may be three memory devices, e.g., implemented as shift registers in LabVIEW: Previous Process Variable PV[n−1], Integrated Error, and Previous Output. These may store information required for the controllers operation (they may be conceptually conceived as the feedback path in FIG. 5). Finally, the Upper Limit and Lower Limit inputs may only be implemented to prevent erroneous results in the calculations (such as, for example, an overflow caused by the limited capacity of the memory devices).

Following the left-to-right flow, the first operations performed may be subtractions to obtain the difference between the Setpoint and the Process Variable SP[n]−PV[n], as well as the difference between the current Process Variable and its previous value PV[n]−PV[n−1]. This may correspond to the summing nodes on the left of FIG. 5. The next step may apply the controller gains to each corresponding term, e.g., Proportional Gain Kp, Integral Gain Ki and Differential Gain Kd, (e.g., as depicted in FIG. 5). These may be combined in different ways inside the case structure. If "True" (shown in 6A), the case structure may define the operations as the addition of the three terms to generate the PID controller output and its feedback. If "False" (shown in 6B), the case structure may allow the output of the controller to be that of the non-linear controller (defined by the manual control input) and may change the feedback for the PID operation in order to prevent saturation of the Integrated Error. The loop structure surrounding the entire code may indicate that the operation is performed continuously.

Thus, as indicated above, a user can change the operation of the programmable power supply by modifying the graphical program (e.g., modifying one or more parameters) and then implementing the modified graphical program on the PHE 420. This provides a much more efficient mechanism to design and modify the operation of the programmable power supply.

Figure 7:
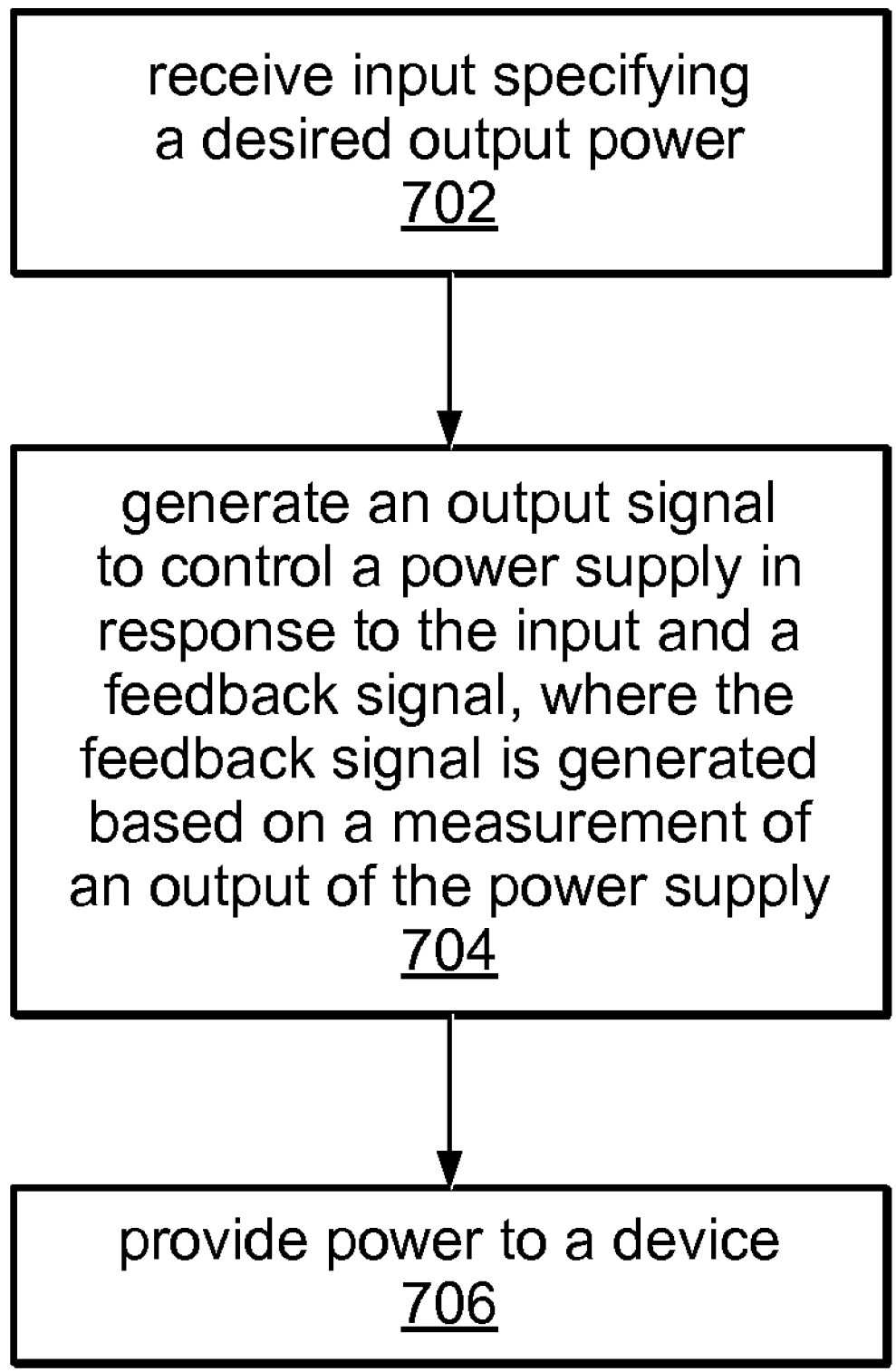
FIG. 7 is a flow chart illustrating an exemplary method for providing programmable power.

FIG. 7—Method for Controlling Power Using a Programmable Hardware Element

FIG. 7 is a flowchart illustrating an exemplary method for controlling power using a programmable hardware element. The method of FIG. 7 may be used in conjunction with any of the systems or methods described herein. Various ones of the illustrated steps may be modified, performed in a different other than shown, or omitted entirely, as desired. Additional steps may be added as desired. As shown, the method operates as follows.

In 702, input specifying a desired output power may be received. In some embodiments, this input may be user input received directly to the programmable hardware element, e.g., acting as a pre-regulator. As described above, the PHE may be included in a PXI chassis (e.g., as a card coupled to the backplane of the chassis). Additionally, in some embodiments, the PHE may be a programmable gate area such as a field-programmable gate array (FPGA). Alternatively, or additionally, the input may be received from another system, e.g., a controlling computer system, such as the host computer 102, described above.

In 704, an output signal may be generated to control a power supply in response to the input and/or a feedback signal. In some embodiments, if the input specifies a new power level (e.g., different than a previous power level) the output of the PHE may be based on only the input. In such cases, in one embodiment, the output of the PHE may be determined by a non-linear controller, such as non-linear controller 430 described above. More specifically, as indicated above, the non-linear controller may be used (e.g., in the place of a PID controller) when output parameters change (e.g., as specified by the input) or when the output voltage drops significantly.

Alternatively, or additionally, the output signal may be based on a feedback signal which may be based on a measurement of output from the power supply being pre-regulated by the PHE. More specifically, the output, e.g., current and/or voltage output, of the power supply may be measured and provided to the PHE using, for example, one or more ADCs. Correspondingly, the PID controller of the PHE may be used in response to the feedback signal instead of the non-linear controller described above. However, it should be noted that in some embodiments the PHE may use non-linear and PID techniques to conjunctively control the power supply. Note further that while the above embodiments have been described with two controllers (a non-linear and PID controller), in some embodiments, the PHE may use a single controller that implements both PID and non-linear control in response to input and feedback signals. Similar to above, the controller may implement the PID and non-linear control separately or conjunctively as desired.

The output signal may be provided to the power supply, e.g., to be used for modulation/modification of power provided by a power source. For example, the output of the PHE (e.g., the pre-regulator) may be provided to the power supply, and, in response to receiving the output of the PHE, the power supply may modulate power signal(s) received from a power source. The power source may be from, for example, the backplane of the PXI chassis to which the PHE may be coupled or from an external power source such as a wall socket (among others). Note that the power source may be a combination of power sources; for example, the power may be provided primarily from the backplane of the PXI chassis and may be augmented by an external power source (e.g., coupled to the PXI chassis). Thus, the output signal may be used by a power supply to provide and maintain output of a stable power signal. More specifically, the outputs signal may be usable, e.g., by the power supply and/or the linear regulator, to minimize power dissipated by the power supply and maximize power delivered by the power supply.

In 706, power may be provided to a device coupled to the power supply. In some embodiments, the modulated power may be first provided to a linear regulator and then provided to the device. Thus, the PHE may provide a programmable power supply. As indicated above, in some embodiments, the PHE may act as a pre-regulator for a linear-regulator, which may provide power to a device.

The PHE may be operable to generate the output signal and receive the digital signal (and/or the feedback signal) a plurality of times to maintain stability of the power signal over time. Thus, FIG. 7 describes various embodiments of a method for providing programmable power.

As described above, the PHE may be implemented/configured according to a graphical program (such as those described above, among others). The graphical program may include a plurality of interconnected nodes (e.g., by lines) which visually indicate functionality of the graphical program. The graphical program may be used to configure the PHE in order to provide the programmable power supply described herein. Thus, the steps described above (e.g., receiving input, generating an output signal, and providing power to a device) may be performed in accordance with one or more graphical programs implemented on the PHE.

Benefits of the Method

The following paragraphs describe exemplary embodiments where the systems and methods above provide benefits over previous methods for power regulation.

More specifically, an example of the flexibility of the method relates to trading off operating point to improve noise performance. It is widely known that at lower collector-emitter or drain-source voltages (required for high efficiency), discrete power devices (used as output pass elements in power stages) exhibit less ability to isolate noise appearing between these terminals. At lighter loads, this issue potentially results in more noise passing from the switch mode pre-regulator to the output. Using various embodiments described above, the operating point may be programmed, e.g., according to a graphical program, to automatically increase the collector-emitter or drain-source voltage when operating at light loads, e.g., by setting the appropriate operating parameters of the PID controller. Thus, the user may easily change the parameters of the power controller instead of designing complex and expensive analog circuitry.

Another example of the flexibility provided by the method relates to optimizing power drawn from the input power source, e.g., the PXI backplane. Power available from the PXI backplane is generally very limited, so it may be necessary to provide an external power source for applications above, for example, 5 W. However, many applications exist for 5 W and lower power levels such that the user may not be required or want to supplement the power provided by the PXI backplane. Using various embodiments described above, different PID set points (e.g., resident on the PHE) may be used for powering from internal PXI power versus external power. If, for example, more power is needed beyond what is available from the PXI backplane, the PID set points may be changed to provide more optimum traded between efficiency and step response.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A programmable power supply system, comprising:
 a programmable hardware element (PHE) having an input for receiving a signal specifying a desired output power, wherein the PHE generates a PHE output signal;

a power supply coupled to the PHE configured to receive the PHE output signal from the PHE and generate a power signal;

a linear regulator coupled to receive the power signal output from the power supply;

voltage measurement logic for measuring the power signal output from at least one of the power supply or the linear regulator;

at least one analog to digital converter (ADC) for converting the measured power signal into a digital signal;

wherein the PHE is configured to implement PID (proportional integral derivative) control and non-linear control, wherein the PHE is configured to receive the digital signal and perform at least one of the PID control and the non-linear control to adjust the PHE output signal to maintain stability of the power signal, and wherein the PHE is configured to determine whether to use the PID control or the non-linear control based on the received signal and/or the digital signal.

2. The system of claim 1, wherein the PHE is configured according to a graphical program, wherein the graphical program comprises a plurality of interconnected nodes which visually indicate functionality of the graphical program.

3. The system of claim 1, wherein the PHE acts as a pre-regulator for the linear regulator.

4. The system of claim 1, wherein the power supply receives power from a power source, and wherein the power supply is configured to use the received PHE output signal and the power source to generate the power signal.

5. The system of claim 1, wherein the PHE comprises a field-programmable hardware element (FPGA).

6. The system of claim 1, wherein the PHE comprises a programmable gate array.

7. The system of claim 1, wherein the output signal is usable to minimize power dissipated by the power supply and maximize power delivered by the power supply.

8. The system of claim 1, wherein the PHE is configured to generate the PHE output signal and receive the digital signal a plurality of times to maintain stability of the power signal over time.

9. A method, comprising:

receiving, by a programmable hardware element (PHE), a signal specifying a desired output power;

generating, by the PHE, a PHE output signal;

receiving, by a power supply, the PHE output signal from the PHE;

generating, by the power supply, a power signal;

receiving, by a linear regulator, the power signal output from the power supply;

measuring the power signal output from at least one of the power supply or the linear regulator;

converting the measured power signal into a digital signal;

receiving, by the PHE, the digital signal;

adjusting, by the PHE, the PHE output signal to maintain stability of the power signal using at least one of PID (proportional integral derivative) control or non-linear control, wherein the PHE is configured to implement the PID control and the non-linear control, and wherein the PHE determines whether to use the PID control or the non-linear control based on the received signal and/or the digital signal.

10. The method of claim 9, wherein the PHE is configured according to a graphical program, wherein the graphical program comprises a plurality of interconnected nodes which visually indicate functionality of the graphical program.

11. The method of claim 9, wherein the PHE acts as a pre-regulator for the linear regulator.

12. The method of claim 9, further comprising:

receiving, by the power supply, power from a power source;

wherein the power supply is configured to use the received PHE output signal and the power source to generate the power signal.

13. The method of claim 9, wherein the PHE comprises a field-programmable hardware element (FPGA).

14. The method of claim 9, wherein the PHE comprises a programmable gate array.

15. The method of claim 9, wherein the PHE output signal is usable to minimize power dissipated by the power supply and maximize power delivered by the power supply.

16. The method of claim 9, wherein said generating the PHE output signal and said receiving the digital signal is performed a plurality of times to maintain stability of the power signal over time.

* * * * *